US007287007B1

(12) United States Patent
Detering

(10) Patent No.: US 7,287,007 B1
(45) Date of Patent: Oct. 23, 2007

(54) TWO-PART PRICING OF DIFFERENTIATED GOODS

(76) Inventor: Dietmar Detering, 260 W. 52nd St. #8J, New York, NY (US) 10019

( * ) Notice: Subject to any disclaimer, the term of this patent is extended or adjusted under 35 U.S.C. 154(b) by 0 days.

(21) Appl. No.: 09/520,123

(22) Filed: Mar. 7, 2000

Related U.S. Application Data

(60) Provisional application No. 60/125,027, filed on Mar. 18, 1999.

(51) Int. Cl.
*G06Q 40/00* (2006.01)
(52) U.S. Cl. .......................................... 705/37; 705/10
(58) Field of Classification Search ................. 705/37, 705/10, 12, 51
See application file for complete search history.

(56) References Cited

U.S. PATENT DOCUMENTS 5,689,652 A * 11/1997 Lupien et al. ................ 705/37
6,035,287 A * 3/2000 Stallaert et al. ............... 705/37

FOREIGN PATENT DOCUMENTS

EP          0411748 A2 *  5/1990
WO        WO99/23595    *  5/1999

OTHER PUBLICATIONS

"Multipart Pricing of Public Goods"; Edward H. Clarke; 1971; Public Choice 11: 17-33.

Quakity Variations in the Circular Model of Variety-Differenciated Products; Nicholas Economides. 1993; Reginal Science & Urban Economics 23: 235-257.
"Monoplastic Competition with Outside Goods"; Bell Journal of Economics 10: 141-156.
"A New and Superior Process for Making Social Choices"; Nicolas T. Tideman et al 1976, Journal of Political Economiy 84 (6): 1145-1159.
"Versioning Information Goods". Hal R.Vaean, htt://ksgwww.harvard.edu/iip/econ/varia.html am Aug. 27, 1998; pp. 1-10.
"Counterspeculation,Auctions,and Competitive Sealed Tenders"; William Vickrey 1961, Journal of Finance 16:8-37.
"Diversity and Quality of Information Products in a Monopolistically Competitive Industry"; David Waterman 1980, Information Economics and Policy 1989/90 (4): 291-303.

(Continued)

*Primary Examiner*—Frantzy Poinvil
(74) *Attorney, Agent, or Firm*—Andrew Wilford

(57) ABSTRACT

A method of making intellectual property goods available by determining and charging prices that reflect the value that consumers assign to an increased variety and quality of those goods available for their use. For this purpose, consumers are bundled into groups. Through a communications network members of the groups vote in samples on the purchase of personal, nontransferable usage rights of as many intellectual property goods as possible by stating their willingness to pay for desired outcomes. A pivotal tax levied on pivotal voters ensures truthful demand revelation. All nonvoting members of the group then pay for the use rights a price resembling the voting sample's revealed willingness to pay or, in case of an approval of the purchase of usage rights, the price the voting sample voted on.

6 Claims, 9 Drawing Sheets

Utilization of an Option to Use a Good at its Use Price

OTHER PUBLICATIONS

"Multipart Pricing of Public Goods"; Edward H.Clarke, 1971; Public Choice 11: 17-33.

"Quality Variations in the Circular Model of Variety-Differenciated Products"; Nicholas Economides, 1993; Regional Science and Urban Economics 23: 235-257.

"Monoplastic Competition with Outside Goods"; Stephan C.Salop, 1979: Bell Journal of Economics 10: 141-156.

"A New and Superior Process for Making Social Choices"; Nicolaus T. Tideman & Gordon Tullock. 1976; Journal of Political Economy 84(6): 1145-1159.

"Versioning Information Goods"; Hal R. Varian; 1997; http://ksgwww.harvard.edu/iip/econ/varian.html am Aug. 27, 1998.

"Counterspeculation,Auctions,and Competitive Sealed Tenders"; William Vickrey; 1961; Journal of Finance 16: 8-37.

"Diversity and Quality of Information Products in a Monopolistically Competitve Industry"; David Waterman, 1990; Information Economics and Policy 1989/90 (4): 291-303.

* cited by examiner

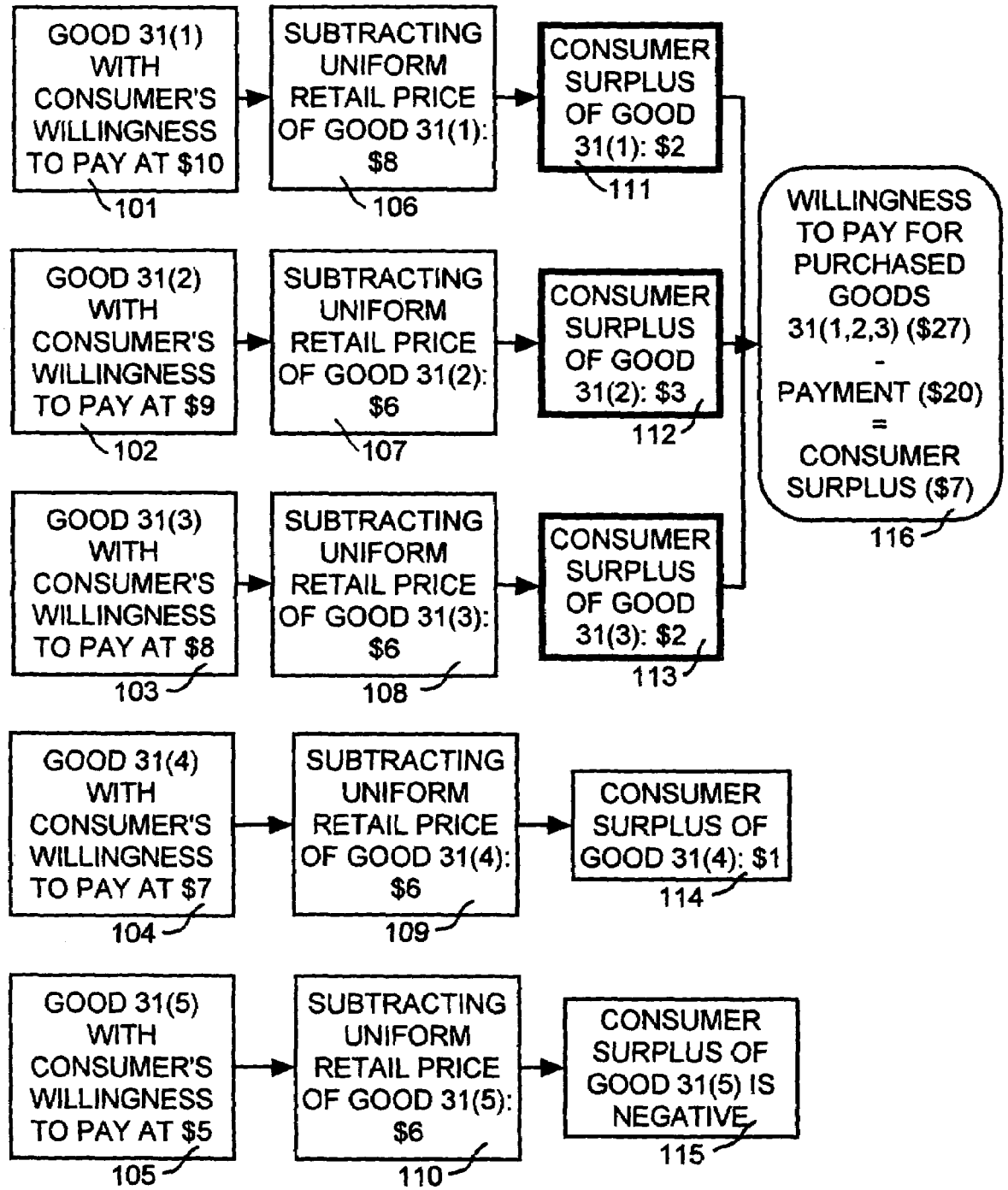
Fig.1a: Conventional Market with Uniform Retail Prices

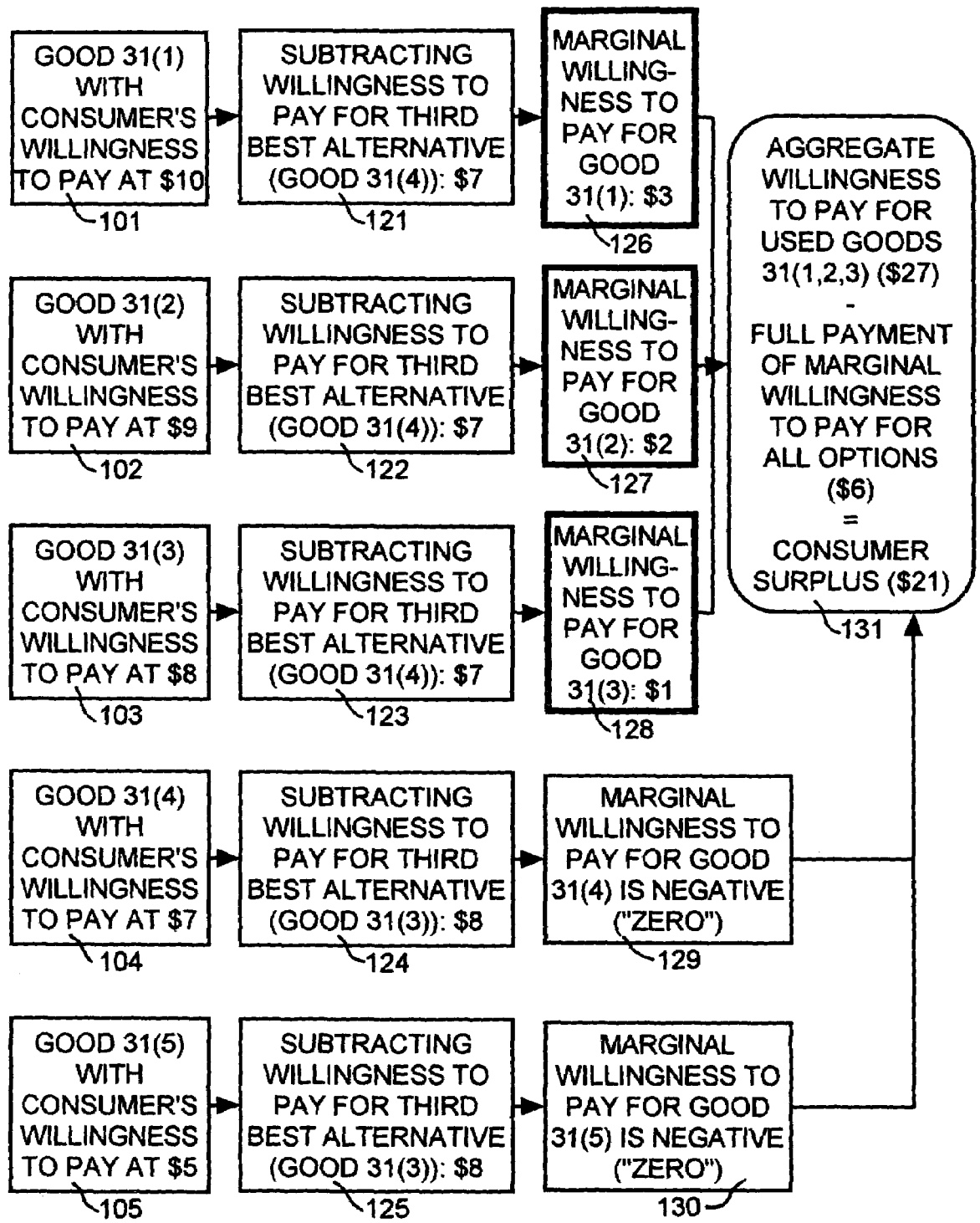
Fig.1b: Option Pricing

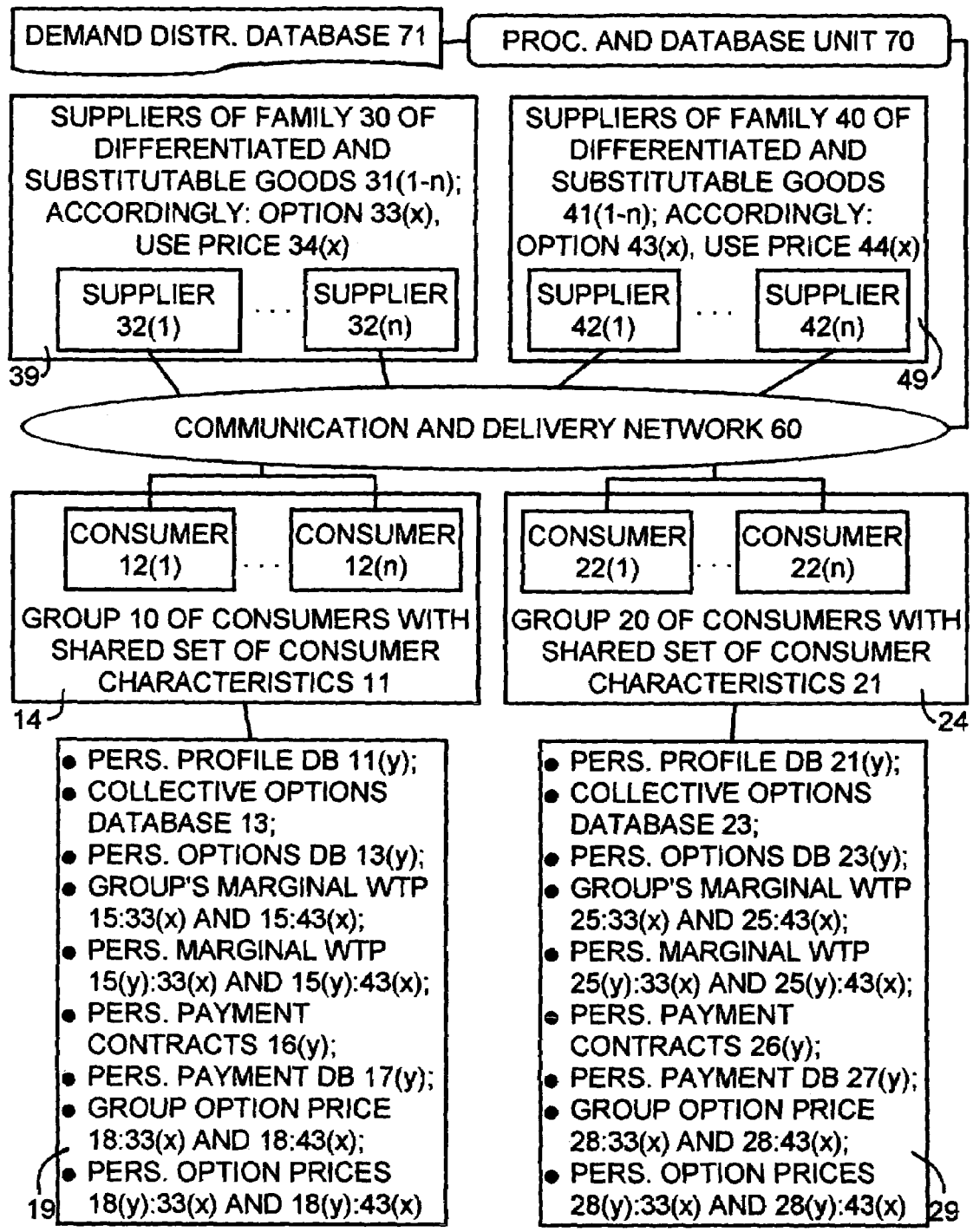
Fig.2: Overall Environment 80

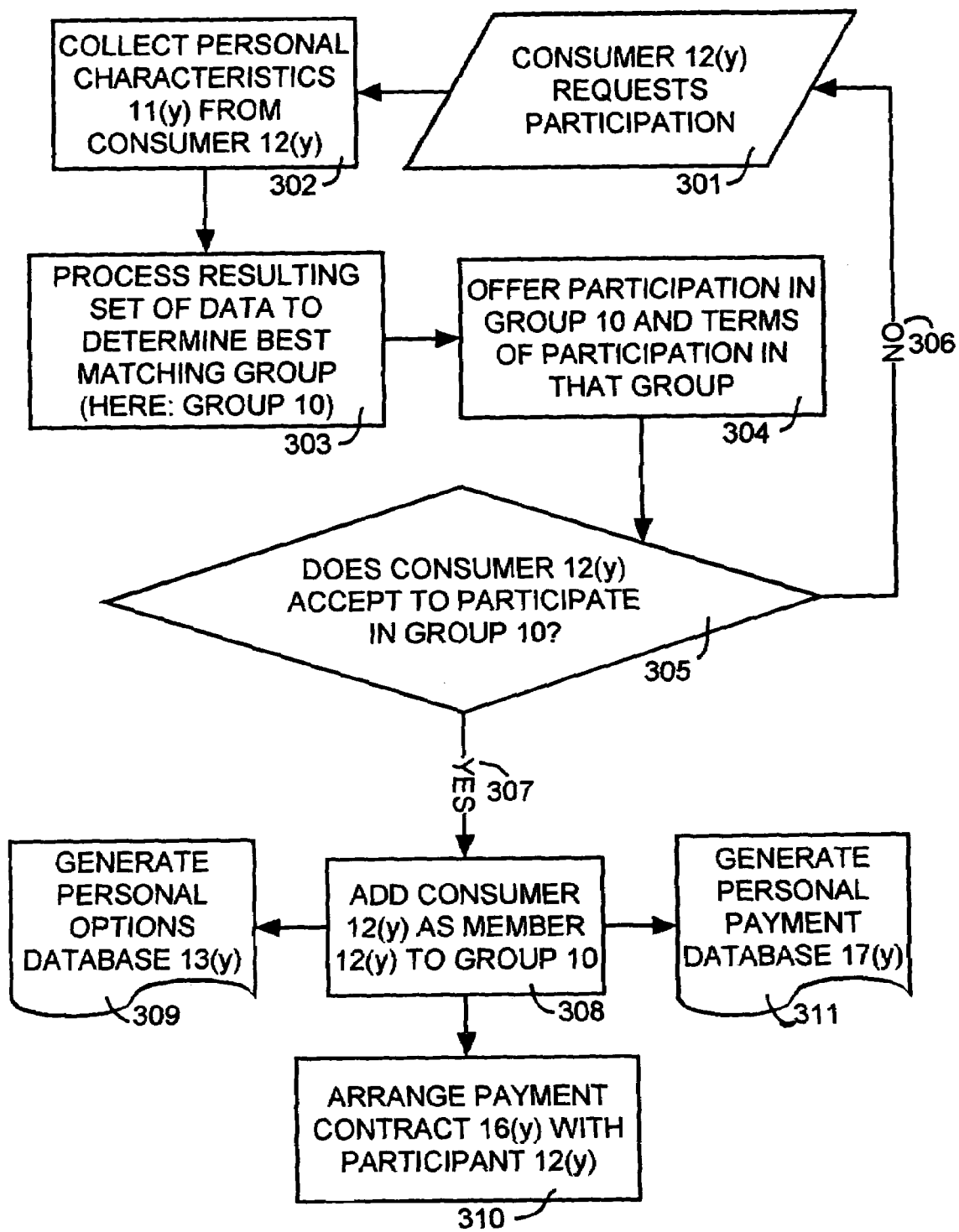
Fig.3: Group Forming

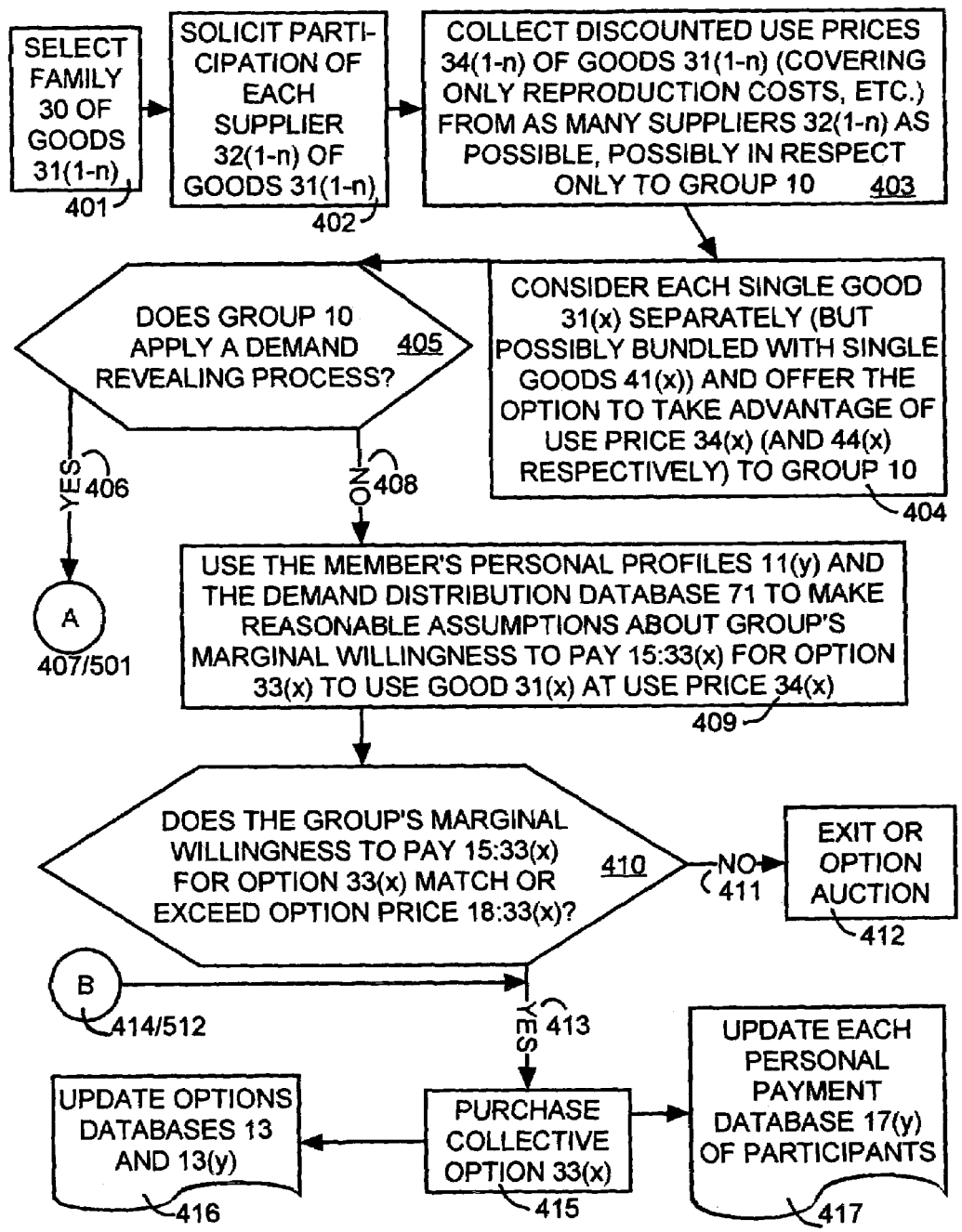
Fig.4: Collective Purchase of Options

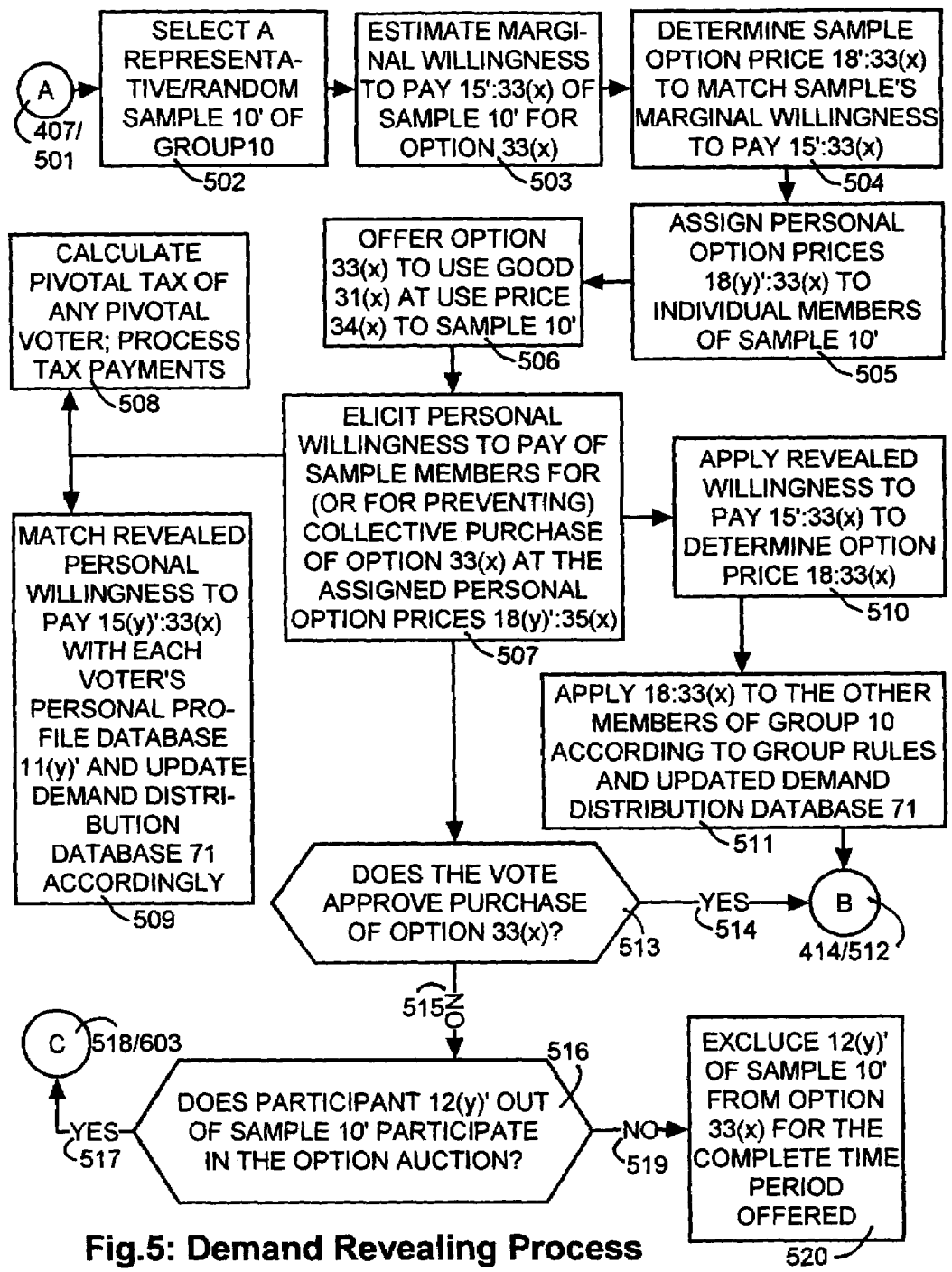
Fig.5: Demand Revealing Process

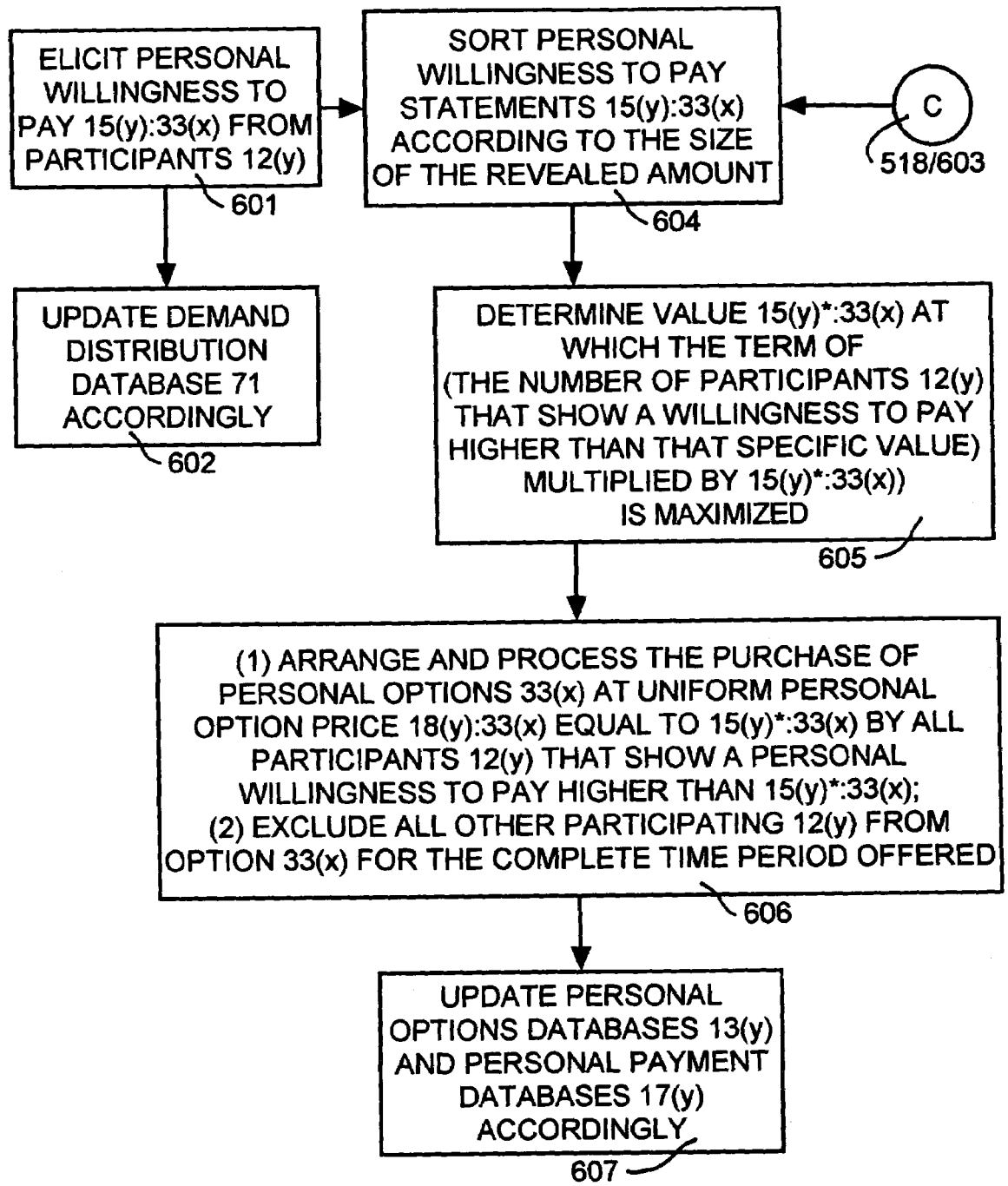
Fig.6: Option Auction

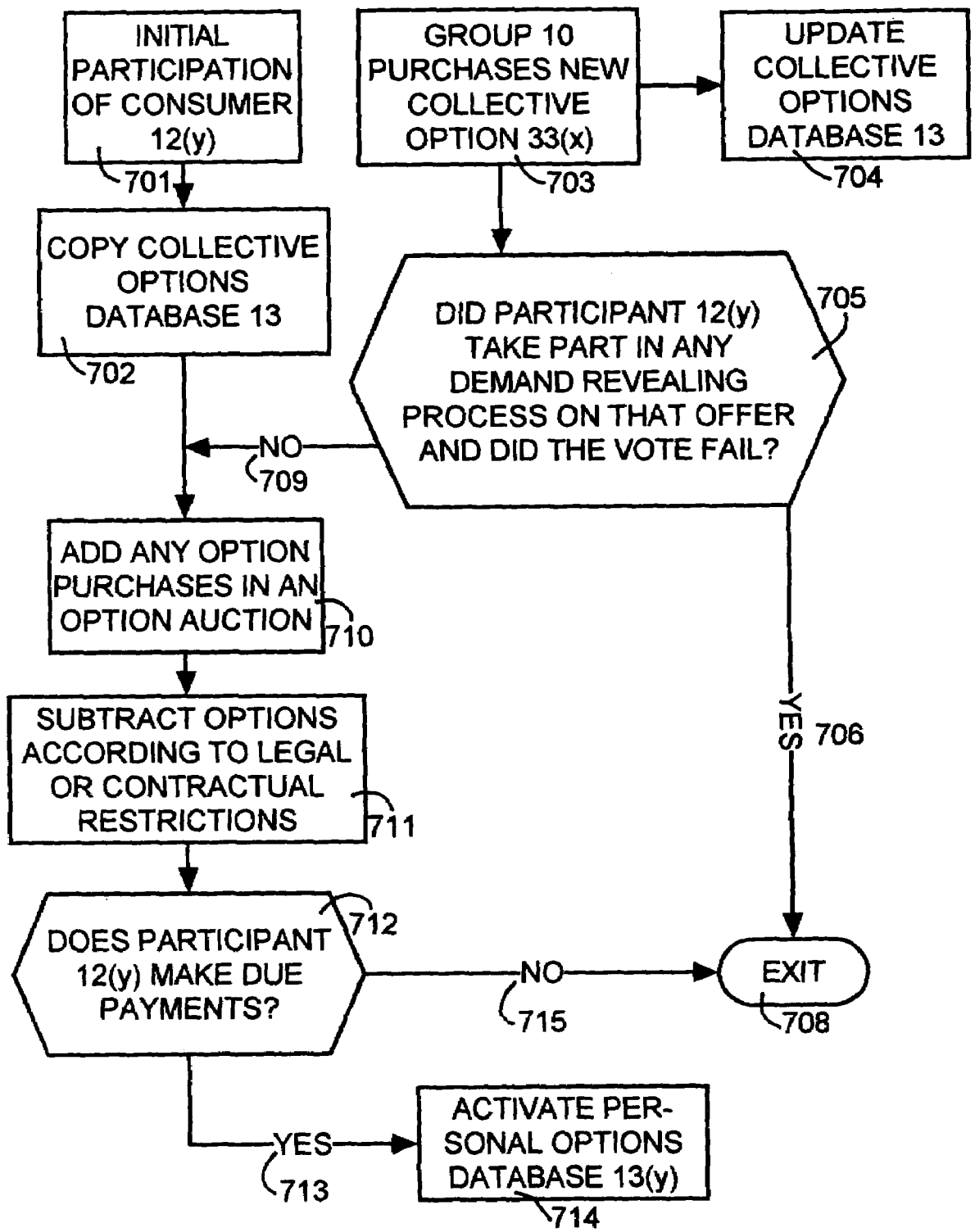
Fig.7: Generation and Maintainance of Personal Options Database

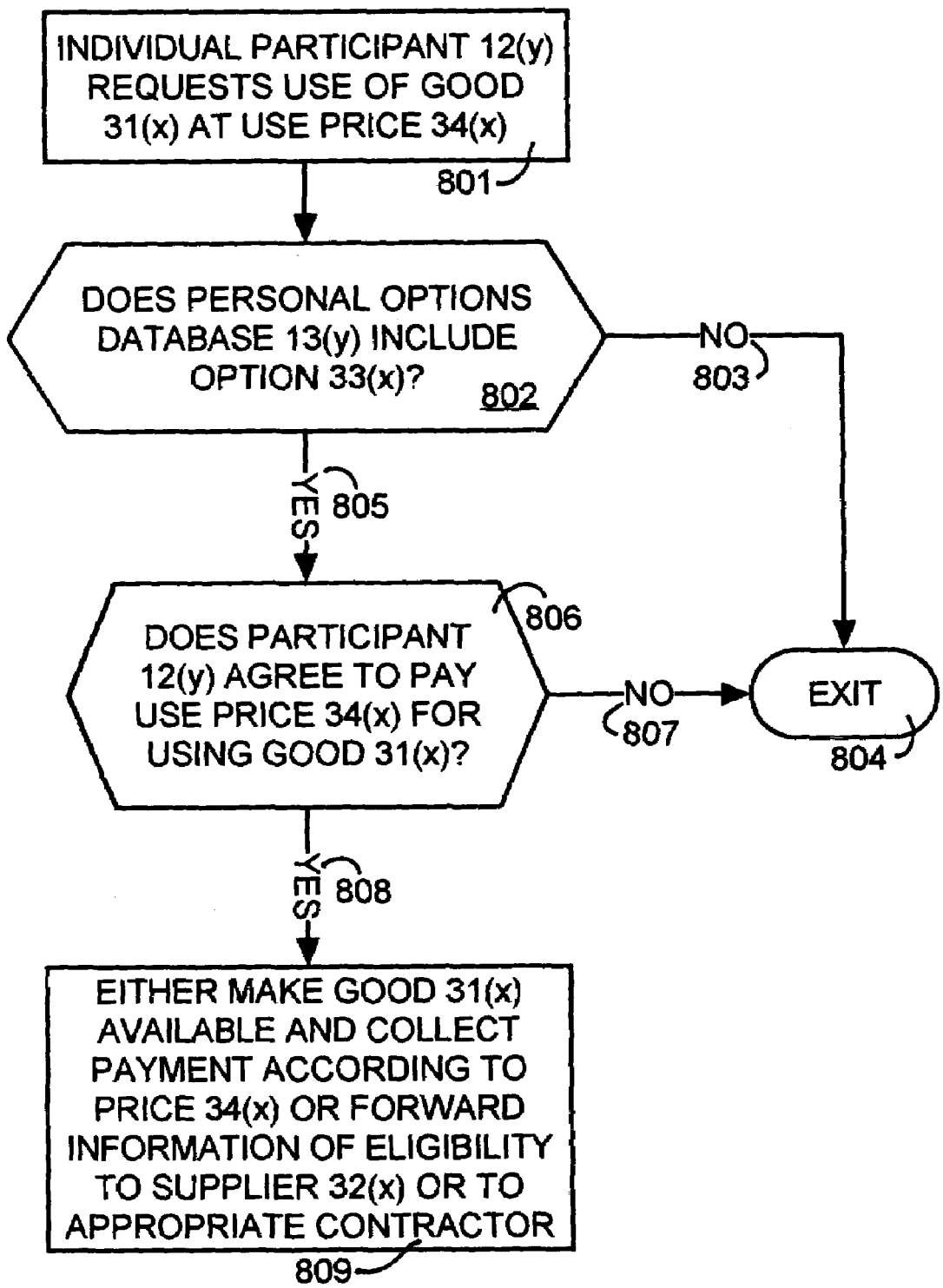
Fig.8: Utilization of an Option to Use a Good at its Use Price

TWO-PART PRICING OF DIFFERENTIATED GOODS

CROSSREFERENCE TO RELATED APPLICATIONS

This application is a replacement for Provisional Application 60/125,027 filed 18 Mar. 1999, which is hereby incorporated by reference.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

For most goods of a modern economy, the traditional rule that the price ideally equates marginal costs of production is not economically viable. The reason for this is that initial costs of product development, design, and marketing account for major parts of total costs while the marginal costs of production are often comparatively low. Setting prices equal to marginal costs would drive producers to bankruptcy due to revenues that are too small to cover the costs of product development. (One example for this is computer software: Product development can be high, but serving one additional customer over the Internet costs only a few cents.)

However, setting prices above marginal costs has several serious disadvantages: First, it will exclude potential buyers only because their willingness to pay is lower than the asked price, even if their willingness to pay is higher than the corresponding marginal costs of production. Second, recent research in microeconomic theory of markets for differentiated goods has also shown that uniform prices result in an oversupply of product variety and an undersupply of product quality. This multiple market failure results in (1) goods' prices that far exceed those prices that would need to be paid in a welfare optimal equilibrium, (2) suboptimal freedom to use the existing variety of goods, and (3) suboptimal product quality. (Compare, e.g., Economides 1993; Salop 1979; Waterman 1990.)

One way to solve the aformentioned problems is to charge differentiated prices, so that no one will be excluded without economic need, meanwhile generating sufficient revenue to cover costs. Several methods of price discrimination, classified according to Arthur Cecil Pigou as Second or Third Degree Price Discrimination, are known to the field of economics. Although they are mostly superior to uniform pricing, all of them have serious limitations as to facilitate a welfare optimal equilibrium of prices, variety, and quality of products and to facilitate access of all consumers that are normally excluded by uniform pricing.

Prior Art: Price Discrimination

Common definitions of price discrimination apply if a supplier intentionally sells to consumers at different prices that do not reflect differences in costs of production, distribution, or service. Perfect price discrimination, known as Pigou's First Degree Price Discrimination, would always charge the consumer's full willingness to pay. Applying this form of pricing would enable a supplier to reach any potential customer and to extract maximum revenue/profit from the market without leaving any surplus to the consumers. (However, supposing that competitors with close substitutes are also able to engage in perfect price discrimination, potential revenue will be significantly reduced. This will be shown later in this specification.)

However, perfect price discrimination is limited by two phenomena: First, it requires prohibitively high transaction costs to establish a different price with each potential customer. Second, it is very difficult to determine the actual willingness to pay of each potential customer. It would not only be very appealing to the customer to hide his willingness to pay, but it would also be very easy to do so. Therefore, perfect price discrimination is hard to reach.

Second degree price discrimination aims at a self-segmentation of the market by offering different price/quality and/or price/quantity combinations. Customers with a high willingness to pay are to voluntarily choose the combination with the higher price, while customers with a low willingness to pay are to choose a low price/low quality or low price/small quantity combination. While second degree price discrimination can often help to service market segments that otherwise would not be served, many potential consumers remain excluded from using the product. Therefore, production output may remain too small and average price may remain too high. Also, some forms of second degree price discrimination "spoil" a product to offer a low quality version. (Compare Varian 1997) This purposeful quality reduction adds to the unintendedly inferior product quality that is to be expected according to the results of the theory of markets for differentiated goods.

Third degree price discrimination aims at identifying market segments with different willingnesses to pay for a product and separating them along unchangable consumer characteristics (age, profession, gender, etc.), localization, or time. The same quality is offered to all segments, but prices are different. Again, some market segments might be served that would not be served without segmentation, but many potential customers are still excluded and prices may remain on too high a level.

Prior Art: Clubs

Generally speaking, clubs aim at charging two prices: The membership fee is an option price to use a collective facility, and the second price is designed to reflect the marginal costs of using that facility, including the costs of facility congestion prohibiting other club members from using it. An example is a tennis club: During off-peak times the hourly usage fees are very low for members, during peak times, however, fees are high enough to avoid congestion and thus to provide a court to any member willing to play at that time and at that price. Those hourly charges that account only for the purpose of avoiding congestion can be reinvested in new facilities and the remaining investment costs can be covered by membership fees.

This club model, however, while showing a two part pricing model similar to the present invention, does not aim at charging a membership fee that reflects the members' willingness to pay for an increased variety of choices, nor does it aim at providing options for as many competing goods as possible. Also, this club model is particularly suitable for goods that are produced exclusively for that club and that are likely to be congested, e.g., a tennis court.

Another club model, employed particularly by book clubs, traveler clubs, discount clubs, and the like, offers itself for making available at discounted prices goods that are not exclusively produced for that club. However, these clubs lack either the ability to link the membership fee to the value that a members places on an increased variety and quality of choices or don't forward any part of membership fees to the suppliers of discounted goods. Therefore, these clubs often provide only second grade products, like off-season hotel rooms or two-year-old best-selling books. Also, these clubs generally offer only a limited variety of all products available on the market, as this is the only way that they can attract suppliers to participate: Their compensation is to be seen in increased sales of difficult-to-sell products. In addition, for this reason, prices for single units of purchased goods still need to exceed the marginal costs of providing additional consumers with that good. Otherwise, suppliers would nave neither an incentive to participate nor a compensation for increasing the available choice of differentiated goods.

Prior Art: The Demand Revealing Process and Applications Thereof

In the preferred embodiment, the present invention makes use of Clarke's Demand Revealing Process (1971, DRP) to determine a group's aggregate willingness to pay for the option to use a good at a discounted "use price". Also, the revealed demand is used as input into a demand distribution database which in turn helps to determine the optimal option price for groups that don't apply Clarke's or other demand revealing processes. (This way of exploiting the beneficial properties of the Demand Revealing Process is unique to this invention.) Prior applications of the DRP (proposed ones and those that have been put into practice) are limited to discrete or continuous decisions on the production of public goods or other activities that do not affect other persons outside the voting group. For example, traditionally proposed applications of the DRP would be able to determine the welfare effects of producing a public good, say a motion picture to be shown on TV. Also, it would be able to determine the proper amount to be invested on that motion picture so as to maximize welfare. (Compare Tideman and Tullock 1976) There has been no suggestion, however, about how to determine the proper amount to be paid by other groups that are interested in the option of watching that motion picture once it has been already produced. The application proposed herein, however, is explicitly designed to determine a proper payment for options that already exist and which can benefit other persons.

Prior Art: Auctions

In one embodiment, this invention makes use of a special auction scheme, best described as a multiunit, sealed bit, uniform second price, single unit-demand, private valuation auction with no resale, wherein the number of supplied units of the auctioned good is determined ex-post bidding by the provider of the goods so as to maximize profits. Also, the people eligible to participate in the bidding are determined ex-ante auction. While such an auction scheme can be developed from well-known elements of modern auction theory, its application to sell options for the unlimited personal use of goods at discounted use prices is unique. Here, the auction sells such a high number of options that the purchased options reduce the bidders willingness to pay for other options rather than that they are utilized for the actual purchase of the corresponding goods. This is especially true for the auction of bundles of options for goods that are not substitutes—as doing so when selling the goods themselves would be rather impractical. In fact, this option auction's effect of reducing a buyer's willingness to pay could not be achieved at all if the auction process would be applied to auction the goods themselves as suggested by the prior art. The "option auction" part of this invention may also be used in combination with the core part of the invention: If the purchase of a specific option can not be achieved by the normal process, but options of close substitutes already have been purchased, then the option auction helps to determine the appropriate price so as to satisfy remaining demand.

OBJECTS OF THE INVENTION

One object of this invention is to make any good available at a use price equal to the marginal costs of using that good to every participant in those cases in which a uniform use price that covers the full costs of production would exceed marginal costs of using the good and which would, therefore, inefficiently exclude potential consumers. Thus, this invention would greatly increase the freedom of consumers to use the existing product variety while paying a welfare maximizing price for doing so. Also, it would enable the suppliers to reach any potential consumer without worrying about the proper price.

Another object of this invention is to make the participating consumers pay a price for each single option to use a good at a use price covering only the marginal costs of using that good, wherein this option price reflects the individually perceived value of the utility produced (a) exclusively by the option to use a good at its use price and (b) in addition to the utility of having the corresponding option of each rivaling product of competing suppliers. Thus, the invention enables the participating consumers to fully exploit the substitution rivalry of competing suppliers.

While meeting the second object guarantees that the sum of all option prices can be surprisingly low (despite the fact that a great number of options needs to be purchased), still another object will be reached at the same time: The suppliers of goods will be fully compensated for their contribution to the welfare of the participating consumers. Thus, prices, product variety, and product quality of those goods that are made available through application of this invention will approach a welfare optimal equilibrium the more potential consumers participate. Therefore, this invention restores a natural property of conventional markets where conventional markets with uniform prices fail.

Additionally, this invention has the object of generating a demand distribution database that helps to closely estimate (1) a group's aggregate willingness to pay for single options or bundles thereof and to closely estimate (2) overall demand for goods that currently don't exist but which are in some way similar (but not equal) to one or more goods that already exist.

Also, it is the object of this invention to protect the privacy of participating consumers by keeping confidential any personal data that is needed for properly carrying out the present invention.

Still another object of this invention is to reduce the high transaction costs that are currently present in the conventional methods of selling and purchasing goods.

DEFINITIONS

Before presenting the summary and the detailed description, it will be helpful to first define specific terms that are used throughout this disclosure. Terms in italics are either introduced or they will be defined beneath the corresponding headings.

Differentiated and Substitutable Goods:

Differentiated and substitutable goods are a multiplicity of products and services that share certain particular economic properties: The initial costs of product development, design or marketing are high while the marginal costs of using the good are comparatively low. Because of this, the uniform retail prices of these goods on conventional markets exceed the marginal costs of using these goods. In perfectly competitive markets, these prices would be driven down to marginal costs of using the good. However, each differentiated and substitutable good is protected from perfect competition either by intellectual property law (trademarks, patents, copyrights) or through high initial costs of market entry of potential competitors. Therefore, uniform retail prices can be kept well above marginal costs of using the good. However, the retail prices need to be kept low enough to prevent competitors from trying to cannibalize the market by reducing the prices of similar products. These similar products, which are not equal but different, may substitute another good, given only an attractive price or the unavailability of a particular good. Examples of these differentiated and substitutable goods are the services of two similar music stores at different locations, several labels of designer jeans, or information goods such as action motion pictures. A group that includes all goods that may serve in some way as substitutes for each other will be called in the context of this invention a family of differentiated and substitutable goods. The kind of competition among these goods is not a perfect competition but a so called monopolistic competition. Of course, some goods whose uniform retail prices exceed marginal costs of using the good don't face even this form of imperfect competition—their suppliers control a monopoly. These products are very likely to be made available by the present invention, too. For simplicity, these products will be considered in the context of this invention as a family of differentiated and substitutable goods on their own. Also, more or less comprehensive definitions of families of goods can be made. For example, one can consider all audiovisual information goods as one family of goods instead of considering exclusively, say for example, Hong-Kong-made action motion pictures as one family of goods. For the further disclosure of this invention, however, this will not be of any further concern.

Family of Differentiated and Substitutable Goods:

See differentiated and substitutable goods

Goods:

See differentiated and substitutable goods

Marginal Costs of Using a Good:

The marginal costs of using a good include all costs and benefits that only occur (1) because of this specific use of that specific good and (2) because of making this use possible. Therefore, the marginal costs of using a good account for the marginal costs of production (i.e., the sole costs of producing an additional unit of the good or service), the marginal costs of distribution, the marginal costs of consumption, and any positive or negative effects that do not affect the corresponding consumer or supplier themselves (so called "external effects"). The marginal costs of using can be sometimes almost zero (as is true for many information goods) or even negative. For example, an advertiser expects some increase in profits from a consumer watching his commercials and will therefore be willing to pay the consumer for consuming the commercials. The same may be true for educational or cultural TV-programs: There are some reasons to assume that the consumption of such programs may benefit people other than actual consumers. In the context of this invention, of course, the consumer's opportunity costs of using a good are not included in the marginal costs of using a good.

Marginal Willingness to Pay:

See willingness to pay

Option Price:

In this context, the option price is the price to be paid for an option to use a good at its assigned use price. It is the object of this invention to make the participating consumers to pay option prices that equal their corresponding marginal willingnesses to pay for that option. Then, suppliers' profits depend on the option prices raised and not on the actual use of their products, since this is only paid for by the cost-covering-only use prices.

Option:

In the context of this invention, an option means the entitlement of a group or of an individual consumer to the personal use of a specific good at the assigned use price. Options are not transferable and may expire after a pre-defined time period.

Personal Use:

The personal use covers any form of using a good that does not harm the ability of the supplier of that good to further exploit its value by (1) selling it to other consumers, by (2) developing and selling derivative goods, or by (3) selling it to other suppliers for the development and sale of derivative goods. For example, making a number of copies of the same song to listen to it in the car, at home and when jogging is within the limits of personal use. Giving these copies to other persons or playing them as a DJ in a club, however, is beyond the concept of personal use. The same is true with sampling parts of the song for the production of another song to be sold in turn.

Supposed Aggregate Willingness to Pay:

See willingness to pay

Use Price:

In the context of this invention, the use price of a good would ideally be equal to the marginal costs of using that specific good. Because of positive effects of its use (exposure to advertising etc.), this use price can also be negative, in which case a consumer may get paid for using a specific good. Often times, the use price will not exactly account for all marginal costs of the use and for the corresponding external effects, which can be due to bounded information and imperfect institutions. However, it may be also due to the transaction costs associated with collecting the payments of the use price: With information goods, for example, the use price reflecting marginal costs of production and distribution may be so low that it is more efficient not to charge any use price at all. A use price equal to the marginal costs of using a good makes sure that consumption of that good reaches a welfare maximizing level: Use will be extended until the additional utility of an additionally consumed unit equals the overall costs of that consumption.

Willingness to Pay:

The willingness to pay is the maximum price (in terms of money or any other form of payment) a person in willing to pay for a specific good, and in this way manifests his demand for that good. Demand revealing processes are able to reveal the willingness to pay which consumers normally mask and which therefore can only be estimated as a supposed willingness to pay if a demand revealing process is not applicable. Throughout this invention disclosure, the willingness to pay refers to options. Normally, the willingness to pay is observed on an individual basis as a personal willingness to pay. However, in the context of this invention, the aggregate willingness to pay of a group is also significant, since it can be estimated more effectively: The supposed aggregate willingness to pay is more likely to match the true aggregate willingness to pay than a supposed personal willingness to pay would match the true personal willingness to pay because individual differences are likely to be balanced by other members of a group. The marginal willingness to pay is defined herein as the maximum price a consumer is willing to pay for a single option under the condition that he is already able to use all other goods of the same family of differentiated and substitutable goods at the corresponding use prices. It is the object of this invention to match the option price with the personal marginal willingness to pay for that option in respect to any participating consumer at least on the average of all purchased options. Generally, the sum of all marginal willingnesses to pay for options of one family of goods is smaller than the willingness to pay for all options of that family of goods at once.

BRIEF SUMMARY OF THE INVENTION

The objects as set forth above and others which will become apparent hereinafter are attained, in accordance with the invention, by sequentially manipulating both (1) the appearance and behavior of the consumers on the market and (2) the appearance and pricing of goods on the market. Besides the identification of the proper use prices of any single considered good, the invention provides means (1) to make the consumers buy options to use any considered good at the use prices and (2) to make them pay an option price for each single option that—on the average of all options—equals their individually perceived marginal willingness to pay.

One step of the present invention is to bundle consumers into groups that collectively purchase options. Expectations on the aggregate marginal willingness to pay for a specific access right thus can be used to determine an option price that (1) is as high as possible while (2) not exceeding said aggregate marginal willingness to pay. This option price can either be offered to the corresponding supplier of a good or it can be compared to the corresponding price call of said supplier.

A further step is to identify a family of differentiated and substitutable goods and to identify the proper use prices of these goods. There are no problems of leaving the determination of use prices to the suppliers of goods, because it is in the interest of the suppliers to match them with the marginal costs of use. Instead of a fixed price, a use price may as well be defined by a formula that is able to flexibly react on changing circumstances yet preventing illegitimate prices. Also, the use price may be left to market competition by licensing other producers to provide the corresponding goods at competitive prices. Of course, to allow these competitive prices to reflect the proper use prices, the licensed suppliers need to get the production license free of charge, only being demanded to control for the legitimacy of the consumers' requests. Additionally, in any embodiment of the invention, external institutions may be allowed to adjust the use price for any external effects that can be observed with the use of a specific good.

Another step consists of technically enabling the group to purchase options to use every single good of one family of differentiated and substitutable goods at the determined use prices, even if is clear that some options will not be utilized to any extent by any member of the group. This makes it obvious to any one supplier that the group's aggregate willingness to pay for any option will be limited by the availability of all other rivaling goods at use prices. Therefore, the suppliers are forced to accept option price offers of the group (or to make option price calls to the group) that reflect the corresponding marginal willingness to pay for said option: This option price will not only be the revenue maximizing price, but it will also be in many cases the only way of gaining any revenue from consumers being member of such a group.

This central step of technically enabling the group to purchase options to use every single good of one family of differentiated and substitutable goods at the determined use prices rests on three conditions that any embodiment of this invention needs to fulfill:

First, the purchase of options needs to be undertaken collectively, which means that consumers need to expect to pay more than their marginal willingness to pay for some options, meanwhile paying less for other options. Therefore, it is only on average that they can expect to pay an option price that matches their corresponding marginal willingness to pay.

Second, there needs to be some measurement for both the group and the suppliers that the group's actual marginal willingness to pay is matched well enough by the group's supposed marginal willingness to pay, since this value determines the option prices paid by the group and received by the suppliers.

Third, the individual members need to be confident enough that their shares of the option prices paid by the group are—at least on average—close to their individual marginal willingnesses to pay.

The first condition is obviously fulfilled by bundling consumers into groups. For this, either new groups may be formed or existing groups may be activated to purchase options. One example could be the workforce of a business enterprise: The owners decide to attract skillful employees not by paying higher wages but instead to offer fringe benefits in the form of options for their employees to buy differentiated goods at use prices. The same could be seen if a local authority or a university purchases options for its members with the proceeds from taxes or tuition/fees. In all these cases some authority makes decisions on behalf of the members of its entity, aiming at making the membership more attractive even at the expense of some additional funds that these members have to spend as a result.

In one embodiment, the second condition will be fulfilled by making a sample of the group vote on the purchase of one option by application of Clarke's Demand Revealing Process. If the sample can be seen as representational, the revealed marginal willingness to pay becomes visible and does not need to be supposed anymore. This voting data, personal characteristics of the voters, and/or additional assumptions on individual demand can then be used to generate a demand distribution database. Given enough confidence of a group and the suppliers, this database can be used to make reasonable assumptions on the demand for a good and to mutually agree on a supposed marginal willingness to pay for it. Then, it may not be necessary anymore to engage in any voting process to determine an offer's value to a group, and other embodiments of this invention become feasible.

The third condition will be fulfilled by allowing the consumers to switch or quit group membership on one hand and on the other, allow groups to freely accept or to reject applications for membership and perhaps even expel members. This will help to form homogeneous groups in respect to the member's interests and ability to pay. Also, groups may charge differentiated fees according to their member's supposed individual marginal willingness to pay (internal price discrimination). Two forms of competition evolve:

(1) the competition of the groups for members that either (a) pay high fees compared to their membership's effect of raising the supposed aggregate marginal willingness to pay of the group or that (b) decrease the group's average individual marginal willingness to pay; and (2) the consumers' competition for membership in groups where they pay very low fees relative to their actual willingness to pay.

Merging both forms of competition increases the likelyhood that any consumer will be able to find a group where membership is beneficial for him. However, for each case there is no guarantee that the individual shares of the option prices paid by the group are close to a member's individual marginal willingnesses to pay on the average of all collectively-purchased options. Those consumers to whom the confidence is not high enough may choose not to participate in groups that employ this invention, although, to a large extent, the third condition should be fulfilled on the average of all consumers.

In the case where members or entire groups are excluded from purchasing options, for example, because there was no agreement on the appropriate option price, an extension of the two part pricing of this invention can be chosen in the form of the option auction process. Here, consumers are bundled into an option auction group and they reveal their willingness to pay for offered options to use a good at its discounted use price. From these statements, a value is selected so as to maximize the proceeds of the supplier of that option, and every member of said option auction group with a corresponding minimum willingness to pay for said option purchases said option at a price equal to that proceeds maximizing value.

Other steps of this invention include the processing of option price payments, collecting the proper fees if necessary, processing the collective options of the group to identify personal options if any personal exceptions apply, affording the actual use of the goods at use prices, identifying eligible consumers, and processing the payments for the use prices. These and other obvious steps are technicalities to execute the two-part pricing of this invention and can vary depending on different embodiments of this invention.

BRIEF DESCRIPTION OF THE DRAWINGS

These steps and their underlying mechanisms, as well as other objects and advantages of this invention, will be more completely understood and appreciated by the study of a detailed description of the presently preferred exemplary embodiment of the invention taken in conjunction with the accompanying drawings, of which:

FIG. 1a shows a flow chart of a simple consumer decision on the conventional market for differentiated goods with no marginal use costs;

FIG. 1b shows a flow chart of a consumer calculation of the marginal willingness to pay on a market for differentiated goods with option prices;

FIG. 2 shows an overall environment in which the present invention may be used;

FIG. 3 is a flowchart that shows how in one embodiment of the invention the groups of consumers may be formed;

FIG. 4 is a flowchart showing the steps of the collective purchase of options in the currently preferred embodiment of the invention;

FIG. 5 shows a flowchart that explains how the preferred embodiment of this invention employs the Demand Revealing Process after Clarke;

FIG. 6 shows a flowchart explaining the option auction process;

FIG. 7 is a flowchart showing the generation and maintenance of personal options databases and FIG. 8 is a flowchart that shows the administration of the actual utilization of an option to use a good at its use price.

DETAILED DESCRIPTION OF THE INVENTION

First of all, the simple example of FIG. 1a and FIG. 1b shows the basic difference between the proposed two-part pricing and the standard uniform pricing, thus clarifying the main advantages of the present invention. Both Figures show in the left column (boxes 101-105) five goods 31(1-5), all of them belonging to a family 30 of differentiated and substitutable goods. Assume that these goods are motion pictures to be shown in the movie theaters of one town in one month. For simplicity, assume further that the proper use price of each motion picture is zero (due to overcapacities, for example). Therefore, buying and consuming such a good is equal to buying a corresponding option to use the good as in both cases no use costs occur and all options/goods could be bought without wasting resources. We consider only one consumer: He perceives a different willingness to pay for each motion picture and has time to watch only three movies this month, and other months will not be considered (again, for simplicity).

FIG. 1a shows the conventional retail market: The consumers faces fixed prices for each motion picture as indicated by boxes 101-105 and 106-110. In step 106-110, the consumer subtracts each motion picture's uniform retail price from his willingness to pay for each one of the goods and purchases those goods that offer the highest consumer surplus to him. Since he consumes three motion pictures, he chooses the three with the highest remaining consumer surplus: goods 31(1), 31(2), and 31(3) as shown by boxes 111-113. Boxes 114 and 115 show, that the other two goods either will render a very low ($1) or even a negative consumer surplus. Calculating the overall market result in Box 116, the consumer receives goods for which he has an aggregate willingness to pay of $27, pays an aggregate price of $20, and receives a total consumer surplus of $7.

FIG. 1b (option pricing) considers the same setting, only making the assumption that the consumer purchases any good (or option, respectively) while paying only a price equal to his marginal willingness to pay for any one the goods. Boxes 101-105, showing the goods with the willingness to pay for each of them, remain unchanged. However, in step 121 (122-125 respectively), the consumer calculates his marginal willingness to pay for each of the motion pictures under the assumption that he is able to watch any one of the other movies at no extra cost—he expects to be entitled to do so anyway. In step 121, he calculates the difference between his willingness to pay for good 31(1) and his willingness to pay for the good he would substitute with good 31(1). This good is identified easily: Since he will watch only three movies, the good with the fourth highest value to him (the third best alternative to good 31(1)) will be substituted by good 31(1). It is good 31(4) that would have the lowest value to him of those movies that would be watched in the case that he could not watch good 31(1). The difference between his willingness to pay for these movies thus is $3, which is to be seen as his marginal willingness to pay for good 31(1). Correspondingly, step 122 calculates a marginal willingness to pay for good 31(2) at the value of $2, and step 123 calculates a value of $1 for good 31(3). The consumer's marginal willingnesses to pay for goods 31(4) and 31(5), however, are negative under these assumptions: He would already be able to see his most favorite movies, and he has no need to pay for less favorite movies and to watch them instead of another movie. Since it does not cost anything to produce options, the consumer gets the options to watch these movies, yet free of charge. Correspondingly, he makes only a payment for each one of the other movies at the value of his marginal willingness to pay. As in step 116 of FIG. 1a, step 131 of FIG. 1b calculates his consumer surplus as the difference of his willingness to pay for the consumed goods (which are again goods 31(1-3)) and his actual full payment, showing that his consumer surplus tripled to $21.

Of course, it would be easy to find some numbers of willingness to pay and retail prices for this example where the uniform pricing model would be more beneficial for the consumer than the option pricing model. However, the option pricing model complies with the conditions of a welfare optimal market for differentiated goods because suppliers are only, but fully compensated for their actual contribution to the welfare of the consumers. In turn, this ensures that consumers will pay less for the goods on average in the option pricing model, as the cited research in the economic theory of markets for differentiated goods has shown.

FIG. 2 shows an example of an overall environment 80 in which the present invention may be used. This environment includes a communication and delivery network 60 which is able to carry information and goods to be exchanged between those entities and individuals that are connected to the network. Thus, network 60 may be fully represented by the Internet for both the communication and the delivery of many goods (information goods) that may be exchanged in accordance with the present invention. However, network 60 may consist of a variety of electronic communication links, paper mail communication and a delivery or pick up structure as can be observed in today's retail or mail order services.

Box 14 shows that consumers 12(1) to 12(n) are a multiplicity of consumers who may be similar to each other in respect to their interests in using certain goods and their ability to pay. Because they share a set of consumer characteristics 11, they are bundled to the homogeneous group 10 of consumers. Now, the consumers can also be considered as members 12(1-n). Group 10 is connected collectively to the network, but for some parts of the present invention single members 12(1-n) may also be connected to network 60. Analogous to group 10, a group 20 of consumers is connected to the network (box 24). This represents all other groups that are formed according to the principles of group 10 and will not be considered in this description since detailed consideration of group 10 will be sufficient.

Box 39 shows that the suppliers 32(1) to 32(n) are grouped as suppliers of goods 31(1) to 31(n), which in turn belong to the same family 30 of differentiated and substitutable goods. The suppliers are not supposed to engage in any coordinated action (coalition) in the context of this invention. Instead, they are only identified to allow the maximum exploitation of the mutual substitution rivalry of the supplied goods. Therefore, only individual links of the single suppliers are shown to indicate their independent acting. If 31(x) is one good out of goods 31(1-n), 34(x) is the corresponding use price and 33(x) is the option to use good 31(x) at the use price 34(x). Box 49 represents another family 40 of differentiated and substitutable goods. As with the group 20 of consumers, family 40 of goods represents the mere existence of other goods and possibly many other families of goods and will not be referred to again.

The processing and database unit 70, which is also connected to network 60, coordinates several actions in the context of this invention in this embodiment. It also guarantees that these actions are carried out properly, i.e., (1) that the likelihood of fraud is limited, (2) that the privacy of the participants is protected, (3) that the groups can take full advantage of the substitution rivalry of the suppliers, and (4) that the marginal willingnesses to pay for single options is accurately determined. An important task of unit 70 is the generation, updating and storing of the demand distribution database 71. Also, it generates, updates and stores the databases that are shown in box 19 (box 29 respectively; an index y refers to a person out of 1-n just as the index x refers to a good out of 1-n):

personal profile databases 11(y) and 21(y) that contain the—at least in part—confidential data of single group members' personal characteristics;

collective options databases 13 and 23 that contain information about all options 33(1-n) and 43(1-n) that the groups have purchased, including the time of expiration of the options, the option prices 18:33(1-n), 18:43(1-n), 28:33(1-n), and 28:43(1-n) paid for them, and any formula for group internal price discrimination in respect to the options 33(1-n) and 43(1-n);

personal options databases 13(y) and 23(y) that reflect the corresponding options databases as well as any applying personal exceptions to these options; and personal payment databases 17(y) and 27(y) that reflect the personal options databases 13(y) and 23(y) respectively, any applied formula of group internal price discrimination, and any additional charges that are to be processed by unit 70.

Additionally, unit 70 processes the data that are also indicated in box 19 and 29:

the groups' aggregate marginal willingnesses to pay 15:33(x), 25:33(x), 15:43(x), and 25:43(x);

the group members' personal marginal willingnesses to pay 15(y):33(x), 25(y):33(x), 15(y):43(x), and 25(y):43(x);

the personal payment contracts 16(y) and 26(y);

the group option price 18:33(x), 28:33(x), 18:43(x), and 28:43(x); and the personal option prices 18(y):33(x), 28(y):33(x), 18(y):43(x), and 28(y):43(x).

FIG. 3 shows how the groups of consumers are formed in one embodiment of the invention. In step 301, a consumer 12(y) requests participation in the employment of this invention. Then, processing and database unit 70 collects personal consumer characteristics 11(y) (age, gender, income level, profession, educational background, interests, etc.) of consumer 12(y) from herself and/or from secondary sources (step 302). Next, unit 70 processes the resulting set of data in step 303 to determine the best matching group of consumers so as to maximize group homogeneity and satisfaction of the preferences of consumer 12(y). Membership in the one best fitting group (here: group 10) is offered to consumer 12(y) in the next step (304). Also, the conditions of participation, for example a special way to calculate the personal option prices 18(y):33(x) and 18(y):43(x) is explained or—if appropriate—negotiated. If consumer 12(y) does not accept participation in group 10, he may repeat the process or resign entirely (decision arrow 306). However, if he participates (decision arrow 307), he will become member 12(y) of group 10 in step 308. Subsequently and possibly simultaneously, unit 70 generates a personal options database 13(y) for member 12(y) in step 309, arranges personal payment contract 16(y) in step 310 and generates personal payment database 17(y) in step 311.

FIG. 4 shows the steps of the collective purchase of options in the invention's currently preferred embodiment. In the first step 401, either unit 70, any other agent, or group 10 itself selects a family 30 of differentiated goods 31(1-n). In step 402, participation of the corresponding suppliers 32(1-n) of goods 31(1-n) is requested. Any participating supplier 32(x) releases discounted use prices 34(x), valid for any group or only for group 10 (step 403). In the next step 404, the option to take advantage of the discounted use price 34(x) (and 44(x) respectively) is offered to group 10. Step 404 also indicates that any good 31(x) will be considered separately in the subsequent decision process. However, it may be useful to bundle a good 31(x) with another good 41(x) because this would not affect the ability to exploit the substitution rivalry of goods out of one family of goods. Also, some suppliers may prefer to offer not options to single goods but to bundles of many goods of one or more families of differentiated goods. Even though this may reduce the ability of this invention to exploit the substitution rivalry of competing goods, this might not be ruled out.

If group 10 applies the Demand Revealing Process (decision box 405 and decision arrow 406), the decision process continues at connector A in FIG. 5 (step 407/501). If the group does not apply the demand revealing process (decision arrow 408), step 409 estimates the group's marginal willingness to pay 15:33(x) for option 33(x) to use good 31(x) at its use price 34(x) by using the member's personal profile data bases 11(1-n) and the demand distribution database which will be explained in more detail in FIG. 5. In step 410, this estimate of the group's marginal willingness to pay 15:33(x) is compared with option price 18:33(x)—which can be determined and fixed in advance by the supplier 32(x) or be subject to negotiations based on the estimate of 15:33(x). If group option price 18:33(x) is not lower than the estimated marginal willingness to pay of group 10 (decision arrow 411), group 10 either does without option 33(x) (exit) or it applies the option auction (step 412). (The option auction is explained in FIG. 6.) However, if option price 18:33(x) is low enough for the estimate of the group's marginal willingness to match or to exceed it (decision arrow 413), group 10 purchases the collective option 33(x) in step 415. Here, the processes version that employs the Demand Revealing Process connects over connector B from FIG. 5 (step 414/512). The subsequent steps 416 and 417 update the collective options database 13, the personal options databases 13(y), and the personal payment databases 17(y) which will guarantee due payments because of the payment contracts 16(y).

FIG. 5 shows how the preferred embodiment of this invention applies Clarke's Demand Revealing Process. Coming from FIG. 4 over connector A (step 407/501), group 10, unit 70, or any other agent selects a representative sample 10' of group 10 in step 502. Similarly to step 409, step 503 estimates the sample's marginal willingness to pay 15':33(x) for option 33(x). Based on this estimate, step 504 determines sample option price 18':33(x) to match 15':33(x) followed by step 505 assigning personal option prices 18(y)':33(x) to individual members of sample 10'. Step 506 offers option 33(x) to use good 31(x) at use price 34(x) to sample 10'. The next step 507 elicits the personal willingness to pay of the members of sample 10' for (or for preventing) the collective purchase of option 33(x) at the assigned personal option prices 18(y)':33(x). To prevent exaggerated statements of personal willingness to pay for the purpose of an overly strong influence on the collective decision, step 508 calculates a pivotal tax of any pivotal voter 12(y)' and processes payments accordingly:

Whenever a single voter decides the vote differently from what the decision would have been if only he would not have had participated, he must pay—apart from his personal option price 18(y)':33(x) in the case of approval—an additional amount corresponding to the welfare loss of all other voters. Therefore, this second amount is only to be paid by pivotal sample members, whose participation was crucial for the outcome of the vote.

To clarify the pivotal process: The computer program megasoft is available in retail trade for 50 US$. For simplicity, assume that no rivaling substitute is available. Table 1 shows the willingness to pay of the consumers 12(1-10)', who are the only members of sample 10'. The estimate of the sample's willingness to pay for the option 33(megasoft) to use megasoft at the determined use price 34(megasoft) of zero shall be 100 US$. For simplicity again, the assigned personal option prices 18(y)':33(megasoft) are uniform for all sample members: 10 US$.

By voting, each participant not only indicates which decision he favors, but also, how much he favors that particular outcome. Sample member 12(1)', for example, has a willingness to pay of $60 and would acquire megasoft in retail trade, thus gaining a consumer surplus of $10. With the collective purchase, he would save $40 as compared to the purchase in retail trade. Thus, he votes with this value in favor of the collective purchase. 12(2-10)' behave similarly. Member 12(6)' seems to be particularly against the acquisition. He votes with 110 US$ against the offer, although it would cost him only 10 US$. Assume that the decision is all the same to him besides the 10 US$ and he only wants to put a particular strong value on his will. He succeeds and decides the vote: The purchase of megasoft is rejected by 150 to 100 US$ and 12(6)' saves 10 US$.

In calculating the Clarke tax, however, it turns out that the decision would have gone out with 100 to 40 US$ in favor of the acquisition, if only 12(6)' would not have participated in the vote. But with his vote, sample member 12(6)' decided the collective decision against the acquisition, resulting in a net utility loss of 60 US$ for the other sample members. Therefore, 12(6)' needs to pay 60 US$ as pivotal tax for his personal saving of 10 US$, making a loss of 50 US$.

TABLE 1

Sample member 12(6)' decides the vote with his participation

| Sample member | Willingness to pay | Vote "Pro" | Vote "Contra" | Pivotal tax |
|---|---|---|---|---|
| 12(1)' | 60 US$ | 40 US$ | | |
| 12(2)' | 40 US$ | 30 US$ | | |

TABLE 1-continued

Sample member 12(6)' decides the vote with his participation

| Sample member | Willingness to pay | Vote "Pro" | Vote "Contra" | Pivotal tax |
|---|---|---|---|---|
| 12(3)' | 35 US$ | 25 US$ | | |
| 12(4)' | 15 US$ | 5 US$ | | |
| 12(5)' | 10 US$ | 0 US$ | (−0) US$ | |
| 12(6)' | | | −110 US$ | 60 US$ |
| 12(7)' | | | −10 US$ | |
| 12(8)' | | | −10 US$ | |
| 12(9)' | | | −10 US$ | |
| 12(10)' | | | −10 US$ | |
| Sum | 160 US$ | 100 US$ | −150 US$ | 60 US$ |

A change of the voting result is worthwhile for a sample member $12(y)'$ only if the pivotal tax he possibly has to pay cannot exceed the value of his obtained utility improvement. If one member exercises a particularly strong influence on the result by exaggerating his true preferences, a pivotal tax is levied upon him that exceeds the utility improvement. In this way each sample member is motivated to reveal his true willingness to pay $15(y)':33(x)$ in step 507. Since there is no need for the proceeds from the pivotal tax, it would be least irritating to the DRP to waste them. However, it can be expected that the proceeds of the pivotal tax are unlikely to be of high monetary value, so that irritations should be avoidable without wasting the money.

Step 509 shows the first use of the revealed personal marginal willingnesses to pay of the sample members $12(y)'$ for option $33(x)$, which can be processed from the data generated in step 507: Combined with the personal profile databases $11(y)'$, it will help to form, improve, and update the demand distribution database 71. In step 510, the proper group option price $18:33(x)$ for the rest of group 10 is determined based on the sample's revealed marginal willingness to pay $15':33(x)$ for step 510. Based on demand distribution database 71, individually differentiated personal option prices might be assigned to the remaining members $12(y)$ in step 511 if the group rules allow to do so. Otherwise, step 511 divides group option price $18:33(x)$ into equal shares and assigns them to the members as a uniform personal option price $18(y):33(x)$. Following step 511, connector B (step 414/512) leads to FIG. 4's step 415.

Finally, decision step 513 continues with the remaining process for those sample members that actually provided all the data in step 507: If the sample's vote approves the purchase of option $33(x)$ at the sample's option price $18':33(x)$ (decision arrow 514), connector B (step 414/512) leads to FIG. 4's step 415, where option $33(x)$ is purchased at the sample's preassigned personal option prices $18(y)':33(x)$. However, if the sample's vote rejects the purchase of option $33(x)$ (decision arrow 515), decision box 516 offers the possibility to participate in a subsequent option auction. If a sample member $12(y)'$ agrees to participate in the option auction in case of a failing vote (decision arrow 517), he will follow connector C (step 518/603). If he does not agree to participate in the option auction (decision arrow 519), he will be excluded from option $33(x)$ for the complete time period offered. Although this is contrary to this invention's objective of making everybody own any option, it is essential for a truthful demand revelation in step 507. Closing the description of FIG. 5, the conflicting objectives of the optimal sample size can be summarized:

the higher the number of the members of one sample, the smaller is the member's risk of having to pay a pivotal tax;

the higher the number of members of one sample, the more representative is the sample;

the higher the ratio of the number of sample members to the number of remaining group members, the more representative is the sample;

the smaller the total number of all sample members, the smaller are total decision making costs;

the smaller the total number of all sample members, the lower the risk of excluding potential consumers from options; and the higher the total number of all sample members, the better will be the demand distribution database 71.

FIG. 6 shows the option auction process. Although the option auction is applied in this invention only as a follow-up to a refusal of an option price with welfare suboptimal exclusion of potential consumers from the option, it can also be applied as an independent process. The first step 601 of the option auction elicits the personal marginal willingness to pay $15(y):33(x)$ from participants $12(y)$. Because the auction process is most advantageous to participants if they reveal their true willingness to pay, the elicited statements can be used to update the demand distribution database 71 in step 602. Unlike those participants from FIG. 4's step 412 (and persons participating exclusively in the option auction), participants entering the option auction over connector C (step 518/603) have already revealed their willingness to pay and start participation at step 604. Here, the personal willingness to pay statements $15(y):33(x)$ are sorted according to the size of the revealed amount. The next step 605 determines a value $15(y)*:33(x)$ out of all revealed personal willingnesses to pay $15(y):33(x)$ at which the term of (the number of participants $12(y)$ that show a willingness to pay higher than that specific value) multiplied by $(15(y)*:33(x))$ is maximized. Also, the chosen value may also reflect the supplier's other long term objectives such as maintaining a kind of exclusivity of his product (choosing a higher one than the proceeds maximizing value) or increased market penetration of his product (choosing a lower one than the proceeds maximizing value). In step 606, all participants that show a personal willingness to pay higher than $15(y)*:33(x)$ have to pay a uniform personal option price $18(y):33(x)$ equal to $15(y)*:33(x)$ in exchange for personal option $33(x)$. All other participants $12(y)$ get excluded from option $33(x)$ for the complete time period offered. Finally, step 607 updates the personal options databases $13(y)$ and personal payment databases $17(y)$ of all participants that have purchased option $33(x)$ in step 606.

Of course, an auctioneer could choose in step 605 a value $15(y)*:33(x)$ so as to maximize the product of this value and the number of bidders revealing an amount as high as or higher than that value and, in step 606, accordingly arrange the purchase of that option at a price equal to that value by those bidders. However, as Vickrey (1961) has proven in his seminal paper, bidders would hide their true willingness to pay under these circumstances. The bids could not be used to truthfully update the demand distribution database, and the average revenue would not be higher but equal to the revenue with the suggested second price rule of this option auction where winners pay a price equal to the highest loosing bid.

Again, the example of the software megasoft from FIG. 5 can clarify the procedure. The personal willingness to pay for the software has not changed, and megasoft is still available at the price of 50 US$ in retail trade. Only, the supplier asks for a different price for the collective option to use megasoft—200 US$. This time all sample members 12(y)' vote honestly, the offer is rejected in a vote by 65 US$ "pro" against 115 US$ "contra", and no pivotal tax needs to be paid. Assume that all voters have agreed to participate in the option auction in this case. Thus, the supplier selects as proceeds-maximizing price 35 US$ per individual option (12(3)'s bid), which 12(1) and 12(2) have to pay according to their revealed willingness to pay. This amounts to proceeds of 70 US$ for the supplier, since 12(3)'s bid is rejected according to the applied auction rules. All other group members remain excluded from the use, which means a total welfare loss of 60 US$.

TABLE 2

Failure of the DRP vote after a price call of 200 US$ and change over to the option auction

| Sample member | Willingness to pay | Vote "Pro" | Vote "Contra" | Proceeds-maximizing price |
|---|---|---|---|---|
| 12(1)' | 60 US$ | 30 US$ | | 35 US$ |
| 12(2)' | 40 US$ | 20 US$ | | 35 US$ |
| 12(3)' | 35 US$ | 15 US$ | | |
| 12(4)' | 15 US$ | | −5 US$ | |
| 12(5)' | 10 US$ | | −10 US$ | |
| 12(6)' | | | −20 US$ | |
| 12(7)' | | | −20 US$ | |
| 12(8)' | | | −20 US$ | |
| 12(9)' | | | −20 US$ | |
| 12(10)' | | | −20 US$ | |
| Sum | 160 US$ | 65 US$ | −115 US$ | 70 US$ |

While the option auction (1) increases group homogeneity, (2) improves membership satisfaction, and (3) helps to prevent that potential consumers with a high willingness to pay (and urgent need) for an option are excluded from that option, one needs to be aware that the option auction works at a reduction of very high statements of willingness to pay in the Demand Revealing Process (DRP): If a vote fails, those voters with a very high willingness to pay can be almost certain to get the option at a moderate price in the option auction. Therefore, a rational voter would want to reveal a reduced, similarly moderate willingness to pay in the DRP for the purpose of reducing the likelihood of having to pay a pivotal tax.

FIG. 7 shows the generation and maintenance of personal options databases 13(y) in the currently preferred embodiment of this invention. In step 701, a new consumer 12(y) becomes a member of existing group 10. Step 702 copies the group's collective options database 13 so as to form a basis of the personal options database 13(y). Each time that the group purchases a new collective option 33(x) (step 703), both the collective options database 13 (step 704, for new members entering the group in the future) and each personal options database 13(y) needs to be updated. For the latter, however, decision step 705 controls for the possibility that the participant was a member 12(y)' of a voting sample 10' that rejected option 33(x). In this case, decision arrow 706 leads to exit step 708 and there is no update of the personal options database 13(y) of that particular member 12(y)'. Normally, this will not be the case and decision arrow 709 indicates the update of personal options databases 13(y) according to the collective purchase of option 33(y). Subsequent step 710 adds any option that participant 12(y) purchases in an option auction. In step 711, any option that conflicts with legal or contractual restrictions is filtered out.

Finally, decision step 712 controls whether or not participant 12(y) makes due payments. Only in this case (decision arrow 713) the updated personal options database will be activated (step 714). If payments have not been properly made, decision arrow 715 leads to exit step 708: Although the personal options database has been updated, it will not be activated until due payments are made.

Concluding, FIG. 8 shows how the actual utilization of an option 33(x) to use a good 31(x) at its use price 34(x) is administrated. First, an individual participant 12(y) requests the use of a good 31(x) at its use price 34(x) in step 801. Decision step 802 controls the actual existence of the corresponding option 33(x) in the participant's personal options database 13(y). If it does not contain option 33(x), decision arrow 803 leads to exit step 804. If the presence of option 33(x) in database 13(y) can be confirmed, decision arrow 805 leads to decision step 806. This step controls whether or not participant 12(y) agrees to pay the use price 34(x) for the use of good 31(x). If participant does not agree, decision arrow 807 leads to exit step 804, otherwise decision arrow 808 leads to final step 809. Here, good 31(x) is either being made available to participant 12(y) and payments of use price 34(x) are collected or the information of participants' eligibility for the discounted use price is being forwarded to the supplier 32(x) herself or to any appropriate contractor for the purpose of fulfilling the participant's request. Of course, step 809 takes a different form if good 31(x) has a negative use price: Now, the proper use of the good needs to be controlled to avoid fraud in the form of participants receiving payments of the (negative) use price 34(x) without actually using good 31(x).

While the invention has been described in connection with what is presently considered to be the most practical and preferred embodiment, it will be appreciated that the invention is susceptible to modification, variation and change without departing from the proper scope and fair meaning of the accompanying claims. Of necessity, the steps in the claims are listed in a particular order, though it should be noted that a different order of certain steps in the claims would yield logically equivalent results which are equivalently claimed and are not disclaimed.

I claim:

1. A method of selling personal, non-transferable usage rights of unlimited availability, said method comprising the steps of:

(a) electronically offering through a communications network personal nontransferable usage rights which are executable either at prices that aim at reflecting the costs associated with the execution of said usage rights or under conditions of a competitive supply environment;

(b) storing in a database a group of consumers records and offering through said network to a sample of said group a price for said usage rights to be paid by each member of said sample in case of accepting the offer;

(c) causing said sample to vote on said offered usage rights by members of said sample stating their willingness to pay for either accepting or rejecting said offer and collecting results of said vote through said network;

(d) through said network determining any pivotal payments from any pivotal member of said voting sample whose stated willingness to pay for a certain outcome alone was sufficient to swing the outcome from an outcome undesirable to him or her, said pivotal payment comprising a margin between all pro and contra votes while either including or excluding the vote of a said pivotal member under consideration;

(e) through said network accepting or rejecting offers of said usage rights for all members of said voting sample according to the result of the vote; and (f) through said network correspondingly applying the offered price for the usage rights to said group in the case of an approving vote of the sample, but taking a revealed willingness to pay for said usage rights by the sample as a basis for the price to be paid by the remaining members of the group in the case of a rejecting vote of the sample while excluding said voting sample from the payment for said usage rights.

2. The method defined in claim 1 wherein said prices at which said usage rights are executable are zero or negative in case the costs associated with the execution of said usage rights do not justify the expense of collecting proceeds or in case a supplier wants to promote the use of his or her goods being covered by said usage rights.

3. The method defined in claim 1, further storing additional groups of consumers records in the database in order to allow segregation of consumers into homogeneous groups in respect to the members' supposed marginal willingness to pay for said usage rights, the members' ability to pay, and/or the members' supposed pattern of interest in said usage rights.

4. The method defined in claim 1 wherein, after a said sample revealing a willingness to pay for said usage rights, the prices for said usage rights are offered to suppliers of the goods covered by said usage rights, said suppliers then deciding whether or not to accept.

5. The method defined in claim 1 wherein said sample's revealed willingness to pay for said usage rights is taken as a basis for the price to be paid by the remaining members of the group, irrespective of whether or not said voting sample approved the purchase of said usage rights at the price voted upon.

6. The method defined in claim 1 wherein, in case of a rejection of the offered usage rights, the members of said voting sample are being held not to employ any alternative means of gaining said usage rights for the duration of the rejected usage rights' validity.

* * * * *